(12) United States Patent
Agarawala et al.

(10) Patent No.: US 8,402,382 B2
(45) Date of Patent: Mar. 19, 2013

(54) SYSTEM FOR ORGANIZING AND VISUALIZING DISPLAY OBJECTS

(75) Inventors: Anand Agarawala, Toronto (CA); Ravin Balakrishnan, Toronto (CA)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 12/293,198

(22) PCT Filed: Apr. 18, 2007

(86) PCT No.: PCT/CA2007/000637
§ 371 (c)(1),
(2), (4) Date: Apr. 24, 2009

(87) PCT Pub. No.: WO2007/121557
PCT Pub. Date: Nov. 1, 2007

(65) Prior Publication Data
US 2009/0307623 A1    Dec. 10, 2009

Related U.S. Application Data

(60) Provisional application No. 60/793,630, filed on Apr. 21, 2006.

(51) Int. Cl.
G06F 3/048    (2006.01)
G06F 3/033    (2006.01)

(52) U.S. Cl. ........ 715/765; 715/766; 715/847; 345/173; 345/179

(58) Field of Classification Search .................. 715/765, 715/775, 808, 810, 848, 766, 847; 345/173–179
See application file for complete search history.

(56) References Cited

U.S. PATENT DOCUMENTS

| | | | | |
|---|---|---|---|---|
| 5,835,094 | A | * | 11/1998 | Ermel et al. .................. 715/848 |
| 5,896,133 | A | | 4/1999 | Lynch et al. |
| 5,917,490 | A | * | 6/1999 | Kuzunuki et al. ............. 715/775 |
| 6,243,724 | B1 | * | 6/2001 | Mander et al. ................ 715/273 |
| 6,529,210 | B1 | | 3/2003 | Rees |
| 6,590,593 | B1 | * | 7/2003 | Robertson et al. ............ 715/782 |
| 6,608,628 | B1 | | 8/2003 | Ross et al. |
| 6,618,063 | B1 | * | 9/2003 | Kurtenbach .................. 715/834 |
| 7,509,588 | B2 | * | 3/2009 | Van Os et al. ................ 715/835 |
| 7,532,196 | B2 | * | 5/2009 | Hinckley ...................... 345/156 |

(Continued)

FOREIGN PATENT DOCUMENTS

WO    2007121557 A1    11/2007

OTHER PUBLICATIONS

Wu et al., "Multi-Finger and Whole Hand Gestural Interaction Techniques for Multi-user Tabletop Displays," Proceedings of the 16th Annual ACM Symposium on User Interface Software and Technology: Vancouver, Canada, Nov. 2-5, 2003; [ACM Symposium on User Interface Software and Technology], New York, NY; ACM Press, vol. 5, No. 2, Nov. 2, 2003, pp. 193-202, 10 pp.

(Continued)

*Primary Examiner* — Kieu Vu
*Assistant Examiner* — James T Durkin
(74) *Attorney, Agent, or Firm* — Shumaker & Sieffert, P.A.

(57) ABSTRACT

A method, system and computer program for organizing and visualizing display objects within a virtual environment is provided. In one aspect, attributes of display objects define the interaction between display objects according to predetermined rules, including rules simulating real world mechanics, thereby enabling enriched user interaction. The present invention further provides for the use of piles as an organizational entity for desktop objects. The present invention further provides for fluid interaction techniques for committing actions on display objects in a virtual interface. A number of other interaction and visualization techniques are disclosed.

19 Claims, 10 Drawing Sheets

U.S. PATENT DOCUMENTS

| | | | |
|---|---|---|---|
| 8,181,122 | B2 | 5/2012 | Davidson |
| 2003/0074424 | A1 | 4/2003 | Giles et al. |
| 2004/0021643 | A1* | 2/2004 | Hoshino et al. ............... 345/173 |
| 2004/0117727 | A1 | 6/2004 | Wada |
| 2005/0154991 | A1* | 7/2005 | Jaeger ........................... 715/769 |
| 2006/0085767 | A1* | 4/2006 | Hinckley et al. ............. 715/863 |
| 2007/0064004 | A1* | 3/2007 | Bonner et al. ................ 345/442 |
| 2007/0146347 | A1* | 6/2007 | Rosenberg .................... 345/173 |
| 2007/0192692 | A1 | 8/2007 | Chen et al. |
| 2008/0168382 | A1 | 7/2008 | Louch et al. |
| 2008/0168402 | A1 | 7/2008 | Blumenberg |
| 2008/0168403 | A1 | 7/2008 | Westerman et al. |
| 2008/0309632 | A1 | 12/2008 | Westerman et al. |
| 2009/0070705 | A1 | 3/2009 | Ording |
| 2009/0122018 | A1 | 5/2009 | Vymenets et al. |
| 2009/0228841 | A1 | 9/2009 | Hildreth |
| 2009/0307623 | A1 | 12/2009 | Agarawala et al. |
| 2010/0079405 | A1 | 4/2010 | Bernstein |
| 2010/0211920 | A1 | 8/2010 | Westerman et al. |

OTHER PUBLICATIONS

International Search Report and Written Opinion of application No. PCT/US2010/046688, mailed Dec. 22, 2010, 11 pp.

International Search Report and Written Opinion of corresponding application No. PCT/CA2007/000637, mailed Aug. 16, 2007, 9 pp.

Wikipedia entry: Microsoft Bob, found at http://en.wikipedia.org/w/index.php?title=Microsoft_Bob&oldid=48873217, Apr. 17, 2006, 2 pp.

Wikipedia entry: Magic Cap, found at http://en.wikipedia.org/w/index.php?title=Magic_Cap&oldid=46961398, Apr. 4, 2006, 1 p.

Atwood, Coding Horror—programming and human factors, found at a. http://en.wikipedia.org/wiki/File:Magic_Cap_OS.gif#filehistory, May 25, 2006. 12 pp.

Microsoft® Bob™ version 1 for windows®, found at http://web.archive.org/web/20060206205347/http://www.telecommander.com/pics/links/application%20software/microsoft/Microsoft_Bob_1_0/Microsoft_Bob_1_0.htm, Feb. 6, 2006, 2 pp.

Resco Photo Viewer for S60, User Manual for v5.0, accessed on Jun. 17, 2010, 18 pp. http://www.resco.net/symbian/downloads/RescoViewerS60.pdf.

Office Action from U.S. Appl. No. 12/868,398, dated Oct. 5, 2012, 13 pp.

Response to Office Action dated Apr. 3, 2012, from European Patent Application No. 10760814.3, filed Oct. 10, 2012, 17 pp.

Extended Search Report from EP Application No. 07719564.2, dated Oct. 24, 2012, 7 pgs.

Response to Office Action dated Oct. 5, 2012, from U.S. Appl. No. 12/868,398, filed Jan. 4, 2013, 16 pp.

* cited by examiner

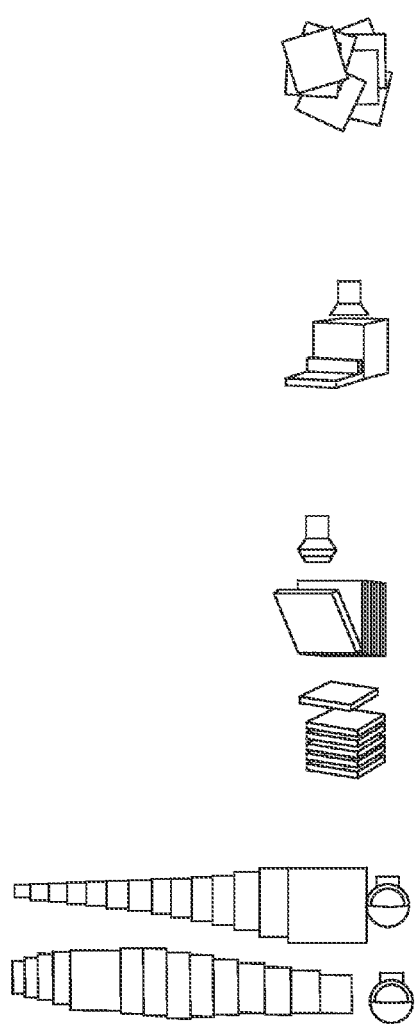
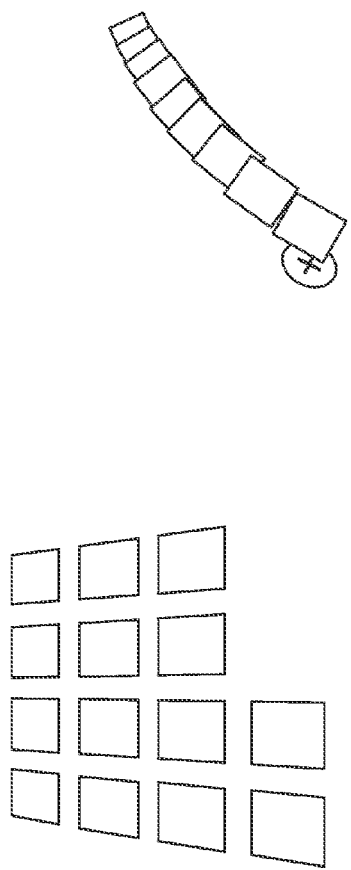
FIG. 5A  FIG. 5B  FIG. 5C  FIG. 5D  FIG. 5E  FIG. 5F

  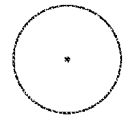 
FIG. 6A    FIG. 6B    FIG. 6C    FIG. 6D
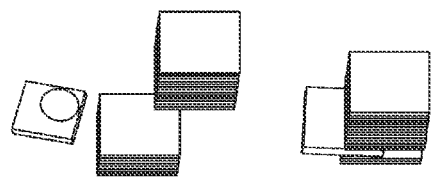
FIG. 7A    FIG. 7B
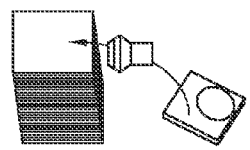 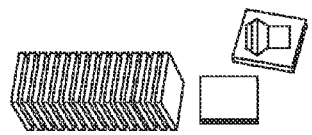 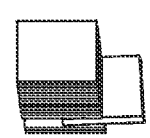
FIG. 8A    FIG. 8B    FIG. 8C

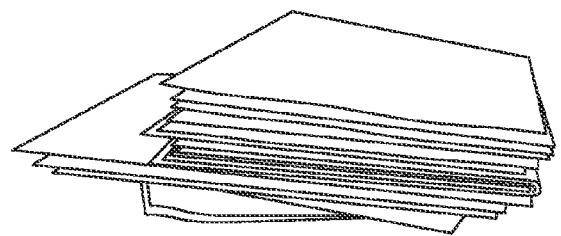 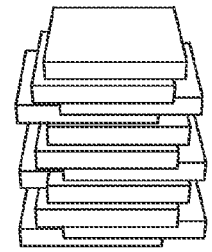
FIG. 9A    FIG. 9B
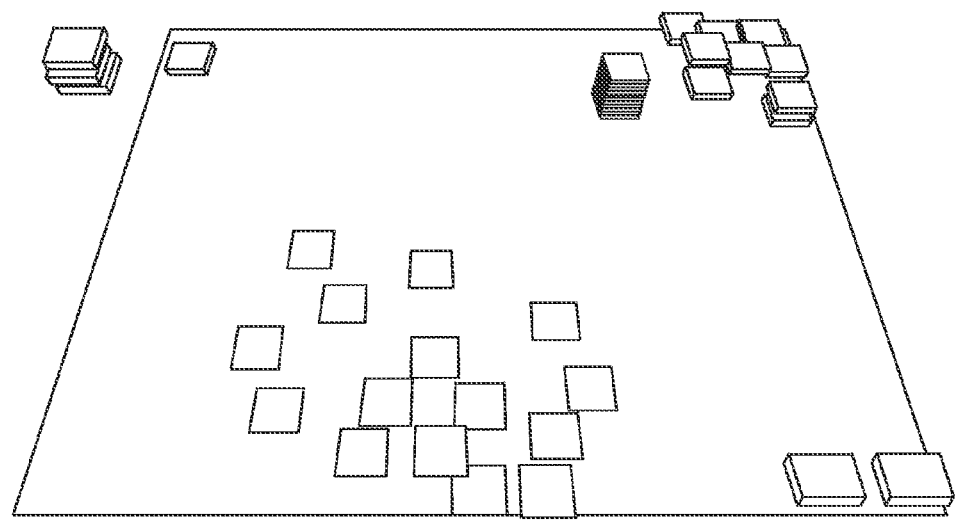
FIG. 10

SYSTEM FOR ORGANIZING AND VISUALIZING DISPLAY OBJECTS

This application claims the benefit of U.S. Provisional Application No. 60/793,630 filed on 21 Apr. 2006.

FIELD OF THE INVENTION

The present invention relates to methods of organizing and visualizing display objects within virtual environments. In particular, the present invention relates to interaction and visualization techniques for organizing display objects within virtual environments.

BACKGROUND OF THE INVENTION

Despite the metaphor, current virtual desktops bear little resemblance to the look or feel of real world desktops. A workspace in the physical world typically has piles of documents, binders and other objects arranged in a way that provides considerable subtle information to the owner. For example, items are often casually placed but their spatial position and orientation are usually meaningful. Closer items can indicate urgency, and piles of items are "automatically" ordered chronologically because new items are typically placed on top. This casual organization, prevalent in the real world, differs greatly from the GUI desktop which forces users to immediately file their documents into a rigid hierarchy. Filing typically requires more effort than piling and has been shown to have other negative effects such as encouraging premature storage of low value documents, or retaining useless documents because of the effort that went into filing them.

There has been significant research and development in this area. Office worker organizational behaviour studies have identified two general paper organization strategies: 'piling' and 'filing'. It has also been found that categorizing and filing items was cognitively difficult. It has been noted that virtual desktops should provide untitled piles that support deferred classification as well as titled, logically arranged files. Further, it has been postulated that 'electronic piles' should make the use of computers more natural.

Piling as an organizing strategy has several advantages over filing. (Whittaker, S. & Hirschberg, J. (2001), The character, value, and management of personal paper archives, ACM Trans on CHI, 8(2), p. 150-170.) Piling is lightweight, casual, involves less overhead, and is easier to maintain than filing. Piles serve as visual reminders and increased availability of recent information. Pilers more frequently access their piles than filers accessed their file archives. Pilers archives may also be smaller, which can be attributed to piled information being easier to discard. Filers reluctantly discard information due to the effort put into initially filing it. Filers also prematurely filed documents later deemed to be of little or no value. In addition, sometimes more than one filing category applies, or an existing category is forgotten and a new one created. On the other hand, piling did not scale well and information was difficult to find once the number of piles grew large. Taken to excess, piling can take over every surface in an office. Despite the advantages of piling, there remains little technological support for piling in today's GUI desktops.

The pile metaphor has been explored in a prototype. (Mander, R., Salomon, G., & Wong, Y. (1992), A "pile" metaphor for supporting casual organization of information, CHI, p. 260-269.) The prototype was based on a user-centered iterative design process. Gestures and interaction techniques were introduced (sometimes modal) for browsing and manipulating piles and facilitating 'casual organization' on the desktop.

Previous work has also looked at piles in different contexts. DiGioia et al. used a pile visualization to aid 'social navigation' and security. (DiGioia, P. & Dourish, P. (2005), Social navigation as a model for usable security, ACM SOUPS, p. 101-108.) Ruffled piles were used to indicate information a group of users frequently accessed. To remove documents or piles from public access they could be moved to a 'filing cabinet'.

DynaPad™'s "open" pile representation laid out entire collections of photos side-byside on a zoomable Pad++™ based workspace. (Bauer, D., Fastrez, P., & Hollan, J. (2004), Computationally-enriched "piles" for managing digital photo collections, IEEE VLHCC, p. 193-195; Bederson, B. & Hollan, J. (1994), Pad++: a zooming graphical interface for exploring alternate interface physics, UIST, p. 17-26.) This representation avoids occlusion of stacked items with each other, but results in higher visual load and greater screen real-estate requirements. The latter issue is mitigated because of infinite canvas. "Open" piles also aim to enhance remindability through visibility of all sub-objects, although this diminishes when the workspace is zoomed out and thumbnails become small. The alternative stack representation is in the spirit of familiar real-world piles and does not require a zoomable interface. The linearly ordered piles support fluid sorting and re-ordering in place without the need for additional tools.

Recent physically-inspired GUI designs rethink windows as paper stacked in piles. Windows can be freeform peeled like real pieces of paper with a robust algorithm. Peeling and re-orientation allows viewing of occluded windows below. (Beaudouin-Lafon, M. (2001), Novel interaction techniques for overlapping windows, UIST, p. 152-154.)

Denoue et al. disclosed using real-time simulated cloth texture-mapped as fliers and pinned up to virtual bulletin board that blow in the wind. (Denoue, L., Nelson, L., & Churchill, E. (2003), A fast, interactive 3D paper-flier metaphor for digital bulletin boards, UIST, p. 169-172.)

Tossing as a window moving technique has also been disclosed. (Yatani, K., Tamura, K., Hiroki, K., Sugimoto, M., & Hasizume, H. (2005), Toss-it: intuitive information transfer techniques for mobile devices, CHI Ext. Abs., p. 1881-1884; Streitz, N., Geißler, J., Holmer, T., Konomi, S. i., Müller-Tomfelde, C., Reischl, W., Rexroth, P., Seitz, P., & Steinmetz, R. (1999), i-LAND: an interactive landscape for creativity and innovation, CHI, p. 120-127.)

The benefits of spatially based organization have also been shown. Leveraging spatial memory in organizing webpage thumbnails on a perspective 2½D plane has showed improved user performance against text-based webpage bookmarks. (Robertson, G., Czerwinski, M., Larson, K., Robbins, D., Thiel, D., & van Dantzich, M. (1998), Data mountain: Using spatial memory for document management, UIST, p. 153-162.)

Recent investigations into pen-based computing have broken away from traditional point-and-click interfaces to techniques that are easier accomplished with the pen such as goal crossing. (Accot, J. & Zhai, S. (2002), More than dotting the i's—foundations for crossing-based interfaces, CHI, p. 73-80.)

In addition to the academic developments and disclosures, there are some notable patents in this field. U.S. Pat. No. 5,303,388 to Kreitman et al. describes manipulable icons that are represented as three-dimensional objects with different data on each side that a user can manipulate. A user is therefore required to manually rotate icons to view the additional information. In addition, representing information on every side of the object constrain the potential shape of the object in order to maintain readability of each of the sides. Representing information on each side of an icon can also waste screen real estate as there may not be any relevant information to display for particular objects.

U.S. Pat. Nos. 5,838,326 and 5,847,709 to Card et al. describes a "flick gesture" to move documents around to different components of an electronic workspace. The system is limited because it allows the documents to be tossed to finite areas only. "Flick gestures" in the cardinal directions are mapped to one-to-one onto specific workspace areas. This limits the expressive range and number of places documents may be moved with this technique. As well, the use of time-based gesture detection has inherent problems in recognition resulting in inaccuracy and false positives.

In U.S. Pat. No. 6,677,965 to Ullmann et al. a virtual rubber-band is created between the cursor and a GUI control such as a slider or scrollbar. This provides visual feedback and variable rate control of the slider dependent on how the cursor is moved from the GUI control. The technique is only applied to discrete 1-dimensional positioning of GUI controls.

U.S. Pat. No. 6,915,489 to Gargi discloses a system that stacks images diagonally and allows moving the mouse in a direction to browse them at a disjoint screen location. This diagonal arrangement with disjoint secondary-image requires a large amount of screen real estate and does not scale well to a very large number of items. The diagonal layout also does not efficiently use the space to the top-right or bottom-left of the diagonal arrangement of images. Also, this stacking technique occludes much of the images with the ones on top of it.

U.S. Pat. Nos. 6,928,621, 5,583,984 and 6,307,545 to Conrad et al. describe a "spring loaded folders" technique. Moving the mouse and pausing over an "enclosure" opens its window temporarily while the mouse is down. The new window may occlude items behind it, and browsing will require moving the mouse cursor outside the layers of sprung open windows, and then reacquisition of potentially occluded other folders.

U.S. Pat. No. 6,907,580 to Michelman et al. describes a moveable user interface element containing displayed options for further manipulation of a selected object. However, user interface elements are triggered by point-and-click interaction, which breaks user flow and is not continuous.

In addition, U.S. Pat. Nos. 6,613,101 and 6,243,724 to Mander et al. discloses a mode-based piling approach to document organization. Gestures and interaction techniques were disclosed for browsing and manipulating piles and "casual organization" on a desktop. However, mode-based interaction techniques are known to be problematic as users often forget what mode they are in or that they need to switch. In addition, their approach uses idiosyncratic gestures which are prone to imperfect recognition and requiring memorization are used to trigger interaction. Also, some of the techniques disclosed are in isolation and not integrated with each other. For instance, sorting piles required a special mode with its own interface inside a dialog box, and is not integrated with the main display.

In light of the foregoing, what is needed is an improved method, system and computer program for organizing and visualizing display objects within a virtual environment. In particular, what is needed is a method, system and computer program that enables easy selection of multiple objects, distinguishing objects, enhanced interaction of objects, enhanced organization of objects, enhanced visualization of object properties and meta-data as well as enhanced browsing techniques. What is further needed is a method, system and computer program product having effective and coherent interaction and visualization techniques for virtual environment organization.

SUMMARY OF THE INVENTION

The present invention provides an improved method, system and computer program product for organizing and visualizing display objects within a virtual environment.

In an aspect, the present invention is a method for organizing and visualizing display objects in a virtual environment comprising: displaying the display objects in the virtual environment, the display objects representing one or more collections of data; and enabling real-time user interaction with the display objects in the virtual environment, wherein the user interaction with the display objects in the virtual environment is defined by pre-determined mechanics rules. The pre-determined mechanics rules are in essence computationally simulated physics implemented as an interface for enriched user interaction with display objects, e.g., file icons on a virtual desktop.

A virtual environment with simulated mechanics is advantageous as it allows objects to be dragged and tossed around with the feel of realistic characteristics such as friction and mass, and objects can collide and displace others. Interactions feel more continuous, analog, natural and realistic to the user, rather than the discrete, rigid, mechnical style imposed by digital computing. This allows users to use the strategies they employ in the real world to both implicitly and explicitly convey information about the objects they own. The present invention also supports the casual organization of information in a manner where users are not forced to commit to categorization, such as the immediate naming and filing of documents. In this regard, users' spatial memory and knowledge of how things move physically in the real world is leveraged.

In another aspect of the present invention, piles are used as an organizational entity for desktop display objects. In general, piles represent an ordered sequence display objects. In another aspect of the present invention, piles can be used to convey playlists in a media context.

In yet another aspect of the present invention, fluid interaction techniques are used for committing actions associated with desktop objects.

Advantageously, the present invention provides for the integration of interaction and visualization techniques into a coherent interface that provides for the easy selection of multiple objects, distinguishing objects, enhanced interaction and realism of objects, and enhanced browsing techniques, among other things.

In further aspects of the present invention, various system implementations are disclosed. Furthermore, a computer program product of the present invention, in one aspect thereof, is best understood as a computer application or computer applications that when loaded on a computer is operable to facilitate the interaction and visualization techniques described above.

BRIEF DESCRIPTION OF THE DRAWINGS

A detailed description of the preferred embodiments is provided herein below by way of example only and with reference to the following drawings, in which:

FIG. 5 illustrates pile browsing layouts triggered by widgets in accordance with the present invention: (a) fisheye; (b) leafing through like pages of a book; (c) Compression-Browsing higher display objects to view display objects below; (d) interpolating between Messy and Tidy positions; (e) grid browse, locked down for further manipulation with Pressure-Lock; and (f) fan out on user drawn path.

FIG. 6 illustrates a pressure cursor in accordance with the present invention: (a) nonnal pressure cursor with no pressure; (b) with 75% of maximum pressure; (c) pen is in a position where PressureLock will trigger additional functionality; and (d) PressureLock with 100% pressure.

FIG. 7 illustrates drag and drop insertion of an object into a pile in accordance with the present invention: (a) drag to pile; and (b) after insertion.

FIG. 8 illustrates Drag'n'Cross technique for precise insertion in accordance with the present invention: (a) user drags document and crosses Leafer widget, pen path shown by green arrow; (b) scrub to specify insertion point; and (c) pen is released and document inserted.

FIG. 9 illustrates a pile with display objects rotated and pulled out for emphasis: (a) in the real world; and (b) virtually in accordance with the present invention.

FIG. 10 illustrates using the concept of axis alignment to enforce a tidier appearance in the virtual environment. The 'shelf' (left) was made by pinning up a rotation-locked display object.

FIG. 13 illustrates the Detailed List View visualization for browsing piled display objects.

FIG. 14 illustrates expanding a sub-pile into Detailed List View for piles that were automatically created based on the creation date of the display objects.

Figure 1:
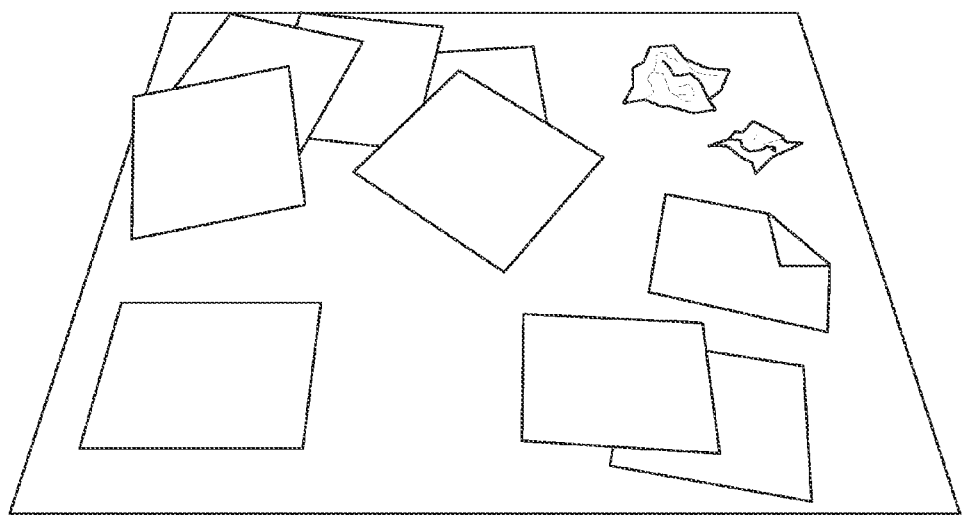
FIG. 1 illustrates a virtual desktop having arbitrarily sized objects, namely a pile of photos (bottom left) and casually arranged (top left) and crumpled up (top right) windows.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention provides an improved method, system and computer program product for organizing and visualizing display objects within a virtual environment.

In one aspect, the present invention utilizes computationally simulated mechanics to enrich user interaction with display objects within a virtual environment, e.g., on a virtual desktop where the user manipulates and organizes icons representing their documents, images, audio, web pages, web content, products in an online store, services in an online store, videos, software programs, file system directories, among other things.

By "mechanics", what is meant is the behaviour of physical bodies in the real world when subjected to forces or displacements. In particular, mechanics-based movement of objects is simulated with regard to rigid body dynamics, mass, gravity, collisions, causality, interpenetration, frictional forces, and appearance properties, among other things. For example, according to an embodiment of the present invention, when display objects collide they bump against and displace one another in a physically realistic fashion. A simulated gravitational force keeps objects on the ground.

By "display objects", what is meant is a virtual object, such as an icon, that represents one or more collections of data. A collection of data can be named, i.e. a file, and can be comprised of data of any sort: text, documents, audio, images, web content, products in an online store, services in an online store, videos, software programs, file system directories, etc.

A virtual environment with simulated mechanics allows objects to be dragged and tossed around with the feel of realistic characteristics such as friction and mass, and objects can collide and displace others, all according to pre-determined mechanics rules. Adding mechanics to the desktop makes the interaction feel more continuous and analog, rather, natural and realistic than the discrete, rigid, mechanical style imposed by digital computing. This allows users to use the strategies they employ in the real world to both implicitly and explicitly convey information about the objects they own. The implementation of mechanics in a virtual environment also supports the casual organization of information in a manner where users are not forced to commit to categorization, such as the immediate naming and filing of documents. In this regard, users' spatial memory and knowledge of how things move physically in the real world is leveraged.

The introduction of mechanics to a desktop environment makes the desktop more lively, and offers increased degrees-of-freedom of manipulation and movement for more expressive organizations of display objects than a traditional GUI desktop where icons are kept axis-aligned and have little resemblance to their physical counterparts. This mechanics simulation has a positive and subtle effect on object placement and appearance. For example, if a few documents are casually tossed to a corner they will collide and begin to accumulate in a way that is visually familiar to the real world. Their messy arrangement subtly affords an unorganized state, without the user having to explicitly specify it.

The present invention can be implemented in either two dimensional or three dimensional virtual environments.

Three dimensions, from the perspective of a user viewing a virtual desktop on a computer screen, for example, is preferred because there are more options in terms of organization.

In another aspect of the present invention, piles are used as an organizational entity for display objects. Advanced piling techniques are described below.

In yet another aspect of the present invention, fluid interaction techniques are implemented for committing actions associated with the display objects, such as piling or unpiling. Advanced interaction techniques are described below. A pen or a touch screen or touch pad is preferred as a primary input device because it enhances the feeling of realism and directness of manipulation since objects being acted upon are visible directly under the pen tip or finger stroke. However it should be understood that these techniques also readily apply to a mouse, trackball, other touch-sensitive surfaces or various other input devices, as would be readily appreciated by a person of skill in the art.

It should be understood that the interaction and visualization techniques for computer-implemented virtual environments in accordance with the present invention include the following aspects:

(1) Realistic Feel. Display objects on the mechanics enhanced desktop move realistically, allowing users to leverage their knowledge of how things move in the real world. For example, after some experimentation with the system a user should be able to figure out that tossing display objects to a corner will cause them to collide and pile up, potentially without explicitly learning the tossing functionality.

(2) Disable Physics as Necessary. It is preferable to leverage the beneficial properties of the physical world, but not be overly constrained by or dogmatically committed to realism. When appropriate, the power of the underlying computer is exploited and the pre-determined mechanics rules turned off or altered when the mechanics simulation proves limiting, counterintuitive, or where reality can be improved on. For example, the simulated physics aspect of the present invention can be disabled to prevent unwanted collisions between explicitly organized display objects. When a group of display objects have been explicitly piled by the user, the response to collisions are disabled on the piled objects so that they do not topple over when hit by display objects accidentally colliding with it.

(3) Tangible, Realistic Display Objects. An aspect of the present invention is to provide documents that feel like tangible physical objects. For example, display objects representing documents can be combined with added mechanics properties such as those of paper. This empowers users to organize their virtual desktops in more casual, subtle and expressive ways as they do in their real workspaces. In an additional example, storage devices could be represented by display objects that represent their physical form factors and mass. This enhances the tangibility of the object.

(4) Enhanced Interaction. The present invention is adapted for use with the new generation of touch-based computer input devices, such as pen-based devices or touch-sensitive screens. On these devices there is often no keyboard is available for triggering interactions. Fluid interaction that avoids excessive point-and-click interaction is preferred when applicable, as is exploiting the pressure sensing capabilities of the pen while avoiding designs that are problematic for pen interaction such as small clicking targets, double clicking and clicking with the right-mouse button.

(5) Discoverable, Learnable Interface. After learning a small set of initial basic interaction techniques, a user should be able to discover how to do more complex interactions on their own. Unlike many gestural interfaces, it is preferable to avoid requiring the user to memorize a large gesture vocabulary before they can use the system effectively. The present invention employs existing discoverable techniques that foster smooth transitions from novice to expert behaviour. In addition, self-revealing interaction techniques are designed by using appropriate visual cues, and support transient easily reversible actions.

(6) Smooth Transitions. To avoid startling and confusing users, the present invention employs smooth slow-in and slow-out transitions for every visual change in data representation. It is established that is easier for users to maintain a mental model of the data across smooth transitions and less time is spent comprehending the new data presentation.

As discussed below, the simulation of mechanics rules can be achieved using the PhysX™ Software Development Kit (SDK), for example. The PhysX™ SDK is provided by the AGEIA Corporation, maker of the PhysX™ Physics Processing Unit (PPU). PPU's are dedicated hardware that handle mechanics rules calculations required by the PhysX™ SDK, freeing the CPU for other tasks. PhysX™ SDK provides a rigid body dynamics solver facilitating collision detection and response, frictional forces, simulated springs, mass response, spring simulation, cloth simulation, etc. Display objects (e.g., file icons) are represented by oriented bounding boxes to the PhysX™ SDK, which for each timestep returns an updated position and orientation for each object, according to the forces in the simulation and the rules of mechanics. User input generates appropriate forces on interacted objects which in turn effect other objects in the system. A simulated gravitational force keeps objects on the ground. The introduction of mechanics simulation to a virtual environment (e.g., the computer desktop) makes it more lively, and offers increased degrees-of-freedom for more expressiveness than a traditional GUI desktop where icons are kept axis-aligned and have little familiarity to their physical counterparts. This physical simulation has a positive and subtle effect on object placement and appearance. For example, if a few display objects are casually tossed to a corner they will collide and begin to accumulate. Their messy appearance subtly affords an unorganized state, without the user having to explicitly specify it.

The present invention contemplates a variety of particular implementations.

As a desktop organizational tool computer program, the present invention could be bundled or integrated with current operating systems such as Microsoft WINDOWS™ or Macintosh OS X™ as replacement or add-on to the built-in desktop with far more capabilities. It is noted that it is possible to incorporate only a subset of the functionality of the present invention to enhance current desktops. This allows leveraging these techniques while maintaining a more familiar interface to the user. For instance, in Microsoft WINDOWS™ the users desktop may remain the same but when a directory is browsed, the contents of the window may optionally be browsed using the techniques disclosed here, amongst the other techniques of browsing a directory contents (e.g., List view, Icon view, Details view, etc.).

3D graphics required to implement the present invention could be achieved by a system-level drawing library with built-in support for hardware accelerated rendering of 3D graphics, such as the recent Windows Presentation Foundation in Microsoft WINDOWS™ or Quartz Extreme in Macintosh OS X™. Alternatively using a hardware accelerated 3D graphics library such as OpenGL™ or DirectX™.

Another approach would be incorporating one or more aspects of the present invention in a specialized version of a standard operating system. For instance, TabletPC optimized versions of Microsoft WINDOWS™ would greatly benefit from the pen-centric interaction techniques, since current TabletPC's simply use the version of windows designed to be driven by a mouse, making interaction cumbersome and awkward.

Alternatively, a stand-alone deployment of one or more aspects of the present invention could be released installed on top of and integrated with current operating systems. Such an application could be used in addition to or in replacement of the current desktop. A desktop in accordance with the present invention could be populated by the display objects from users previous desktop file system directory and changes made on the enhanced desktop in accordance with the present invention would be reflected in the file system. Objects could be bi-directionally moved to and from existing windows and applications to the desktop in accordance with the present invention with drag-and-drop. In addition, activating objects (files or folders) in the desktop interface in accordance with the present invention could launch their appropriate viewer applications.

Another stand-alone approach involves the desktop in accordance with the present invention workspace being completely disjoint from the existing desktop, where documents can be freely arranged without concern for what exists on the desktop.

It should be understood that the present invention can be applied to any implementation having a graphic user interface where advance interaction with display objects is desirable, and is not limited to just personal computers. For example, the virtual environments in personal digital assistants ("PDAs"), mobile phones, BLACKBERRY™ and other devices would be similarly enhanced by the techniques in accordance with the present invention. What are required are a display means, an input device, and a suitable computing means to implement mechanics rules and other interaction and visualization techniques.

Furthermore, both client, web-enabled client-server and peer to peer systems are contemplated. A web-based embodiment of the present invention would be operable to enable the mechanics and organization techniques functionality to a client computer through the Internet. Peer to peer connections of any virtual environment client implementation is also contemplated by the present invention As discussed herein, the present invention contemplates making increased use of document meta-data and enhanced visualization of display object attributes. For example, file size is mapped to mass or volume or friction index of the display object's representation within the virtual environment. Other physical properties could be used as cues for conveying content information. For example, larger files might move slower because they feel 'heavier' or older files appear dog-eared to show their wear. Other physical phenomena could be employed to guide the designs. For example, objects could be modeled as sheets of paper that can be folded in interesting ways to convey information or draped over other objects. It would be also useful to be able to pin something to the desktop like you could to the walls. PressureLock and tear away techniques (described below) could be used to pin and unpin display objects.

Gravitational fields that surround display objects can also be used to attract other similar display objects (e.g., of the same file format) situated nearby within the virtual environment. For instance, a pile full of photos would have a greater pull on a photo being tossed by it than a neighbouring pile of spreadsheets. A gravitational field implementation would also support the escape velocity to allow display objects to be tossed beyond piles that may attract it. Another extension of the physical metaphor includes using a magnet to gather like icons from the desktop. For instance, a video magnet could be used to attract video files from a large unorganized heap of documents while maintaining context. Multiple magnets could be used in conjunction to see spatial relationships.

Furthermore, in real workspaces the landmarks and layout of the desk greatly inform how display objects will be organized. For example, walls can have notes posted on them or shelves will be used to store documents. A desktop interface in accordance with the present invention can incorporate this in a number of ways. For instance, the layout of user's desk can be digitally replicated, or offer virtual templates of standard physical desk configurations to increase user familiarity with the system. Alternately, variations to the desktop's layout could be made to aid in organization, such as permanent shelves, or recessed/raised areas for storage.

In a multiple user scenario, multiple workspaces can exist within a single plane, which when zoomed out could facilitate the transfer of documents between users by tossing them to the desired workspace. Alternatively, these multiple workspaces could be used by a single-user to management and organization of different tasks.

It should be understood that the interaction, visualization and organizational techniques described herein are also well-suited for design applications, either two- or three-dimensional. For example, in the architectural context, a designer is often required to manipulate a great number of objects of his/her virtual desktop. A virtual environment equipped with physics simulation and advanced piling techniques would greatly improve the efficiency by which a designer can create and manage files. As well, the fluid pen or touch based techniques will enhance the feeling of realism and directness of manipulation since objects being acted upon are visible directly under the pen tip, which is akin to the traditional, and often preferred, pen and paper means of design.

It will be appreciated by those skilled in the art that other variations of the embodiments and implementations described herein may also be practised without departing from the scope of the invention. Further illustration of the method, system and computer program of the present invention is provided in the following non-limiting examples.

EXAMPLES

Note that the term "BumpTop™" is used herein to describe a computer product in accordance with the present invention, according to one example embodiment.

BumpTop™ provides users with a perspective "2½D" view onto a planar desktop surface tilted 25 degrees with respect to the camera, as illustrated in FIG. 1. This angle is preferred over a top-down perspective view (which resembles a flat desktop users are accustomed to) because users may find it difficult to distinguish the depths of piles and confused them with single objects.

In this example, motion is constrained to the desktop by the walls enclosing it. The wall corners provide a place for documents to pile up on top of each other and act as a landscape feature that could aid in cognitive grouping of documents. Alternatively, the user can also enable the use of the screen boundaries as walls, off of which display objects will bump and collide. The desktop texture has a number of circles which act as "passive landmarks" that could aid in visually separating groups of display objects. However, users are free to place documents anywhere on the surface.

Files (e.g., documents, text, images, videos) are represented by display objects whose geometry is a 3D cube squashed on one axis, and is texture-mapped on all sides so that when vertically stacked there is an indication of its type. Being able to discern information from icon edges supports a pile browsing behaviour that occurs in the real world called edge browsing. Also, non-zero depth is necessary for the bounding volumes used in the collision detection. Textual labels are optionally presented on top of the display objects.

It is important to note that the techniques of the present invention are scale-independent and can work on any mixture of arbitrarily sized objects. This allows for interesting usage scenarios such as the organization of windows or photographs, as illustrated in FIG. 1. A mixed-mode approach is possible where display objects and folders in the desktop launch standard windowed applications. An alternative is allowing the windowed applications to benefit from the physics paradigm.

Mechanics-based movement of objects is simulated with rigid body dynamics, collision detection, and frictional forces. When objects collide they bump against and displace one another in a physically realistic fashion. A simulated gravitational force keeps objects on the ground. The introduction of mechanics simulation to a desktop environment makes the desktop more lively, and offers increased degrees-of-freedom for potentially more expressiveness than a traditional GUI desktop where icons are kept axis-aligned and have little resemblance to their physical counterparts. This physical simulation has a positive and subtle effect on object placement and appearance. For example, if a few documents are casually tossed to a corner they will collide and begin to accumulate. Their messy appearance subtly affords an unorganized state, without the user having to explicitly specify it.

It should be understood that BumpTop™ enables casual organization of documents as one would on the surface a real, physical desk furniture, using piling rather than explicit filing as the primary organizational style. In accordance with the present invention, a variety of interaction and visualization techniques are utilized implicitly and explicitly for creating, manipulating and organizing piles and display objects within the piles.

Interaction and Visualization Techniques

An input means, such as a mouse, or preferably a pressure-sensitive pen with a single barrel button operating on a TabletPC, allows the user to interact with the display objects in the virtual environment. To facilitate very lightweight interaction for the simplest tasks, the pen by default allows users to move and or toss objects by touching and then dragging or flicking them with the pen in a manner similar to how one might use a finger to manipulate a bunch of lightweight items on a physical surface. A spring is attached from the point on the display object the user first clicked on, to the current cursor position. This allows for the free form, natural, realistic intuitive movement and tossing of display objects. More complex interactions require additional techniques.

LassoMenu

Figure 2:
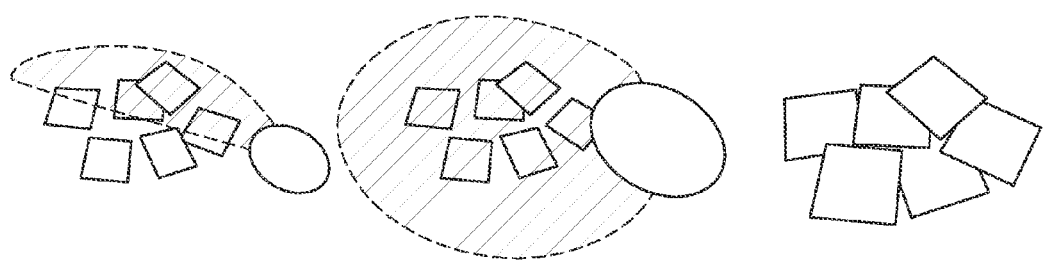
FIG. 2 illustrates a LassoMenu in accordance with the present invention: on the left, the Lasso selection phase is depicted; in the centre the Lasso completed is depicted when pen reaches blue circle and enters control menu; and on the right a resize command selected is depicted, and the remainder of pen movement adjusts resize parameter.

The interaction of display objects can be triggered by a technique called LassoMenu that combines selection, command invocation, and parameter adjustment in one fluid stroke, as illustrated in FIG. 2. Users select display objects in the typical "lasso" fashion of drawing a path that encircles them. Once the lasso stroke has begun and the lasso stroke has reached a minimum distance, a semitransparent circle is placed at the beginning of the lasso stroke. The minimum distance is in proportion to the size of the semitransparent circle. If the stroke is closed by the pen path entering the circle or by re-intersecting the lasso stroke itself, users are presented with a control menu, a marking menu variant in which the user first selects a menu item via a simple stroke and then can choose to smoothly move the pen in a 2D fashion to adjust the value of an associated parameter.

The LassoMenu avoids the pigtail gesture that some users found difficult and was less preferred than the handle technique in the prior art. In addition, the LassoMenu is more fluid than the known handle techniques which interrupts the stroke by requiring the pen to be lifted for the marking menu to appear. Further, there is no gesture to memorize. The unobtrusive semi-transparent blue circle indicates additional functionality, and the user is not penalized for simply exploring it as lifting the pen up before they leave the blue circle does nothing. The inclusion of a control menu enables the fluid transition from novice to expert functionality in that novice users can browse the menu visually to identify and select the desired items while experts who have performed the same selection numerous times in the past can simply make the stroke in the appropriate direction without visually attending to the menu itself. Note that the LassoMenu can, if desired, be used smoothly in combination with existing techniques like the handle and pigtail. Using the pigtail with the LassoMenu allows for command invocation without closing the lasso stroke. It will be appreciated by those skilled in the art that while we describe much of the interaction in the invention as being triggered by the LassoMenu, it may be be invoked by traditional mechanisms instead as well (ie, keyboard keys, menu option, etc.), without departing from the scope of the invention.

Display Object Movement

Display objects on the desktop can be dragged around, and can be attached to the pen position by a dampened spring. This is a popular method of interaction with physical simulations. Movement in the real-world is smooth, where velocities gradually rise and fall instead of the instantaneous movement found in typical GUI applications. By incorporating this spring model into the technique, it affords a subtle effect on the feel of the interaction, making it more lively and physically realistic.

Another benefit of the spring is that it allows a quick flick of an object to toss it across the screen. The display object will naturally decelerate due to friction and will bump and displace objects in its path appropriately. The quicker the flick, the further and more forcefully the object will travel. Multiple objects or piles are moved and tossed in a similar fashion. When a user lasso selects multiple documents, they are highlighted and invisible dampened springs are created between them with a complete graph topology. Selection springs allow the drag or toss of one document to tug along the other documents in the selection while maintaining their relative spatial positioning to each other. These springs are released when documents are deselected by clicking a vacant area of the desktop or starting a new selection.

The pen or touch input can also be used to ruffle through and nudge objects aside as if it had actual physical geometry in the workspace. In the case of a pen, this is accomplished by holding down the pen barrel button while moving it on or above the screen surface. It is noted that accidental triggering has been known to occur with use of the barrel button though new pen designs which move the button further up on the pen minimize this. Alternatively the functionality can be triggered by a different mouse button or keyboard modifier key. The objects in accordance with the present invention behave as if they had certain physical properties. They are moveable, rigid, bouncy, and toss-able. These properties enable a more physically realistic environment and afford users to organize their virtual objects in more expressive ways.

Pile Creation—Lasso'n'Cross

Figure 3:
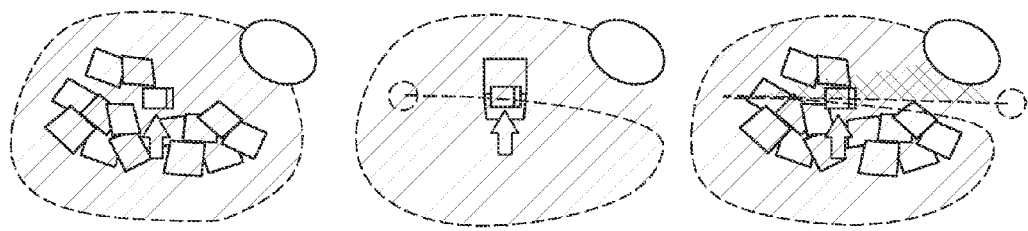
FIG. 3 illustrates the Lasso'n'Cross technique for pile creation in accordance with the present invention: on the left, documents are lasso selected; in the center, a 'Create Pile' icon crossed and a pile is created; and on the right, this action is undone by "un-crossing".

To more explicitly organize a group of display objects piles can be created. Piles are created by lassoing around a group of display objects, then crossing the 'create pile' icon that appears at the group's centroid. This technique is called Lasso'n'Cross (FIG. 3). This technique allows users to fluidly select and pile objects in one stroke. Novice users will typically wait until they notice the icon before completing the stroke, but as they practice making the stroke over successive invocations, they transition seamlessly to expert behaviour where the stroke is made without waiting for the icon to appear. Lasso'n'Cross also supports undo, allowing users to undo and redo the pile creation by consecutively re-crossing the icon. Undoing can be thought of as "un-crossing the initial cross" since the stroke is undone by making it backwards.

Lasso'n'Cross is an improvement over similar pen-based gestures combining selection and a single action in prior art, such as a delete gesture that is triggered if the end of the stroke is inside the closed lasso. It is advantageous because it supports undo and eases the requirement of remembering a gesture by facilitating discovery amongst novices.

By using the convex hull of the lasso stroke to indicate selected display objects (illustrated in FIG. 3) unwanted changes to the selection are avoided from the stroke portion that approaches and crosses the Lasso'n'Cross icon. Further, to prevent accidental crossing of the 'create pile' icon, the icon is only visible when the centroid is not likely to fall near the users lasso stroke. This is typically when the stroke is not a straight line. A heuristic is used to determine if a stream of user input points is a straight line:

$$\text{lasso arc length/distance between lasso endpoints} > 1.2$$

Tidying, Messy Piles and Tidy Piles

Figure 4A:
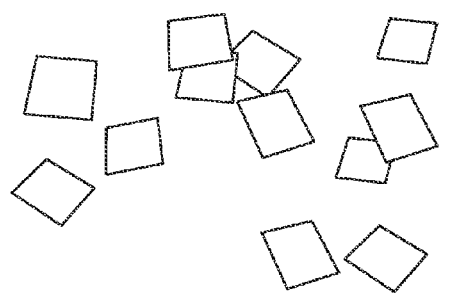
FIG. 4 illustrates organizations examples of an aspect of the present invention, namely: (a) casually laid out documents; (b) tidied unpiled documents; (c) documents made into a Messy Pile; and (d) A Tidy Pile with widgets revealed. The widgets in clockwise order from center-top are: Fisheye, Leafer, Compression-Browse, Grid, Messy/Tidy, Fan out, Move.
Figure 4B:
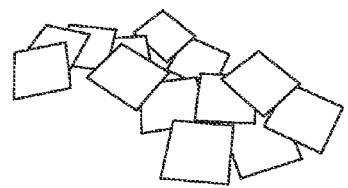
Figure 4C:
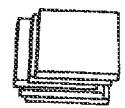
Figure 4D:
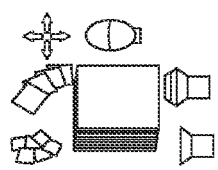

When creating a pile with Lasso'n'Cross the selected object's orientations are tidied, vertically sorted according to their heights and stacked into a Tidy pile, as illustrated in FIG. 4d. The resulting pile replaces the 'create pile' icon at the centroid of the selected objects. This is smoothly animated to avoid confusing the user with an instantaneous new representation of the objects.

Alternatively, using a single LassoMenu option on unpiled objects, the user can choose to tidy them, create a messy pile, or create a tidy pile out of them. The option is determined by the distance between the end points of the stroke drawn after "Tidy/Make Pile" has been selected in the LassoMenu. The option selected in order of shortest to longest stroke is as follows: (1) tidy documents by tightening up their poses but do not create a pile; (2) create a Messy pile; and (3) create a Tidy pile, shown in FIG. 4. These options are ranges on a continuum of stroke distances and selecting in between these ranges specifies the degree of the particular option. The document poses are updated live and the user can "scrub" to create the desired arrangement. Visual feedback during the scrub is provided by icons that appear at the range edges. That is, the points at which a messy pile or tidy pile will be created.

A messy pile integrates some of the objects' messy pose information by interpolating between the messy and tidy arrangements of a pile. Instead of arbitrarily displacing display objects in the pile to achieve a messy appearance, the messy pile concept incorporates meaningful spatial information from the unpiled state.

Figure 11:
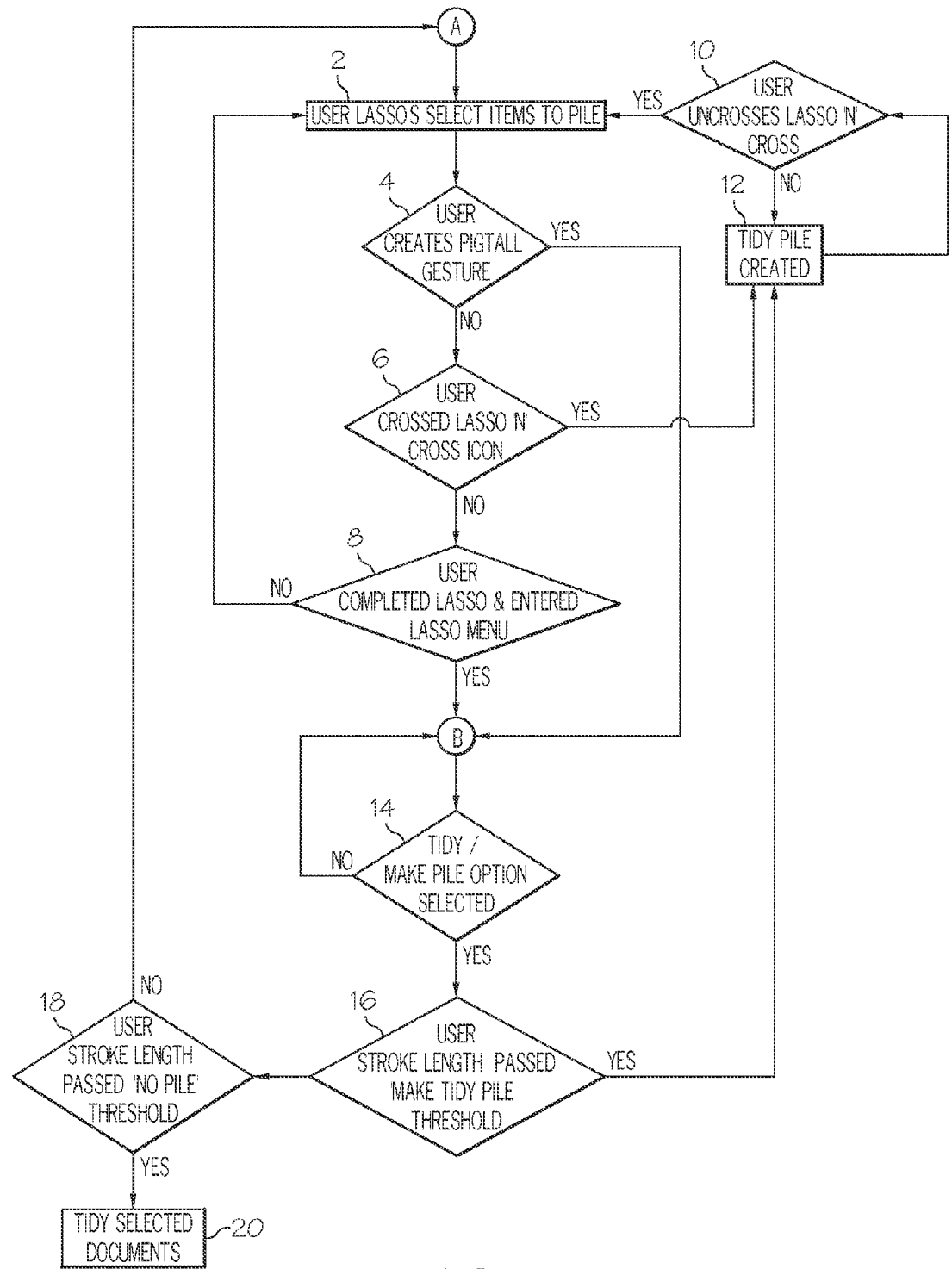
FIG. 11 illustrates a flowchart depicting the steps of a pile creation aspect of the present invention.

The particular steps of pile creation are best understood with reference to FIG. 11. A user first lassos two or more objects on a virtual desktop in order to select them (2). Optionally, after lassoing the objects the user can create a pigtail gesture (4), which in turn invokes a command requesting whether the user would like to tidy or make a pile (14). If the pigtail gesture is not created after lassoing, the user may also optionally use the Lasso'n'Cross technique which allows fluid selection and piling of the objects in one stroke (6). If so, a tidy pile is created (12), but can be uncreated if the user uncrosses the Lasso'n'Cross gesture (10). If uncrossed, the objects are released from the lasso, allowing the user to lasso other objects (2). If after lassoing objects the user does neither the pigtail gesture nor the Lasso'n'Cross (8), the LassoMenu is entered (16). The user is then presented with the "Tidy/Make Pile" option (14) which, as stated above, is determined by the distance between the end points of the stroke drawn after "Tidy/Make Pile" has been selected in the Lasso Menu 5 (16). If the stroke length is passed the "make tidy pile" threshold (16), then a pile is created (12). If the stroke length is not passed the "no pile" threshold (18), then no pile is created (A). If the stroke length is passed the "no pile" threshold (18), then the objects are tidied (20).

Supporting Pile Browsing with Widgets

Figures 13, 14:
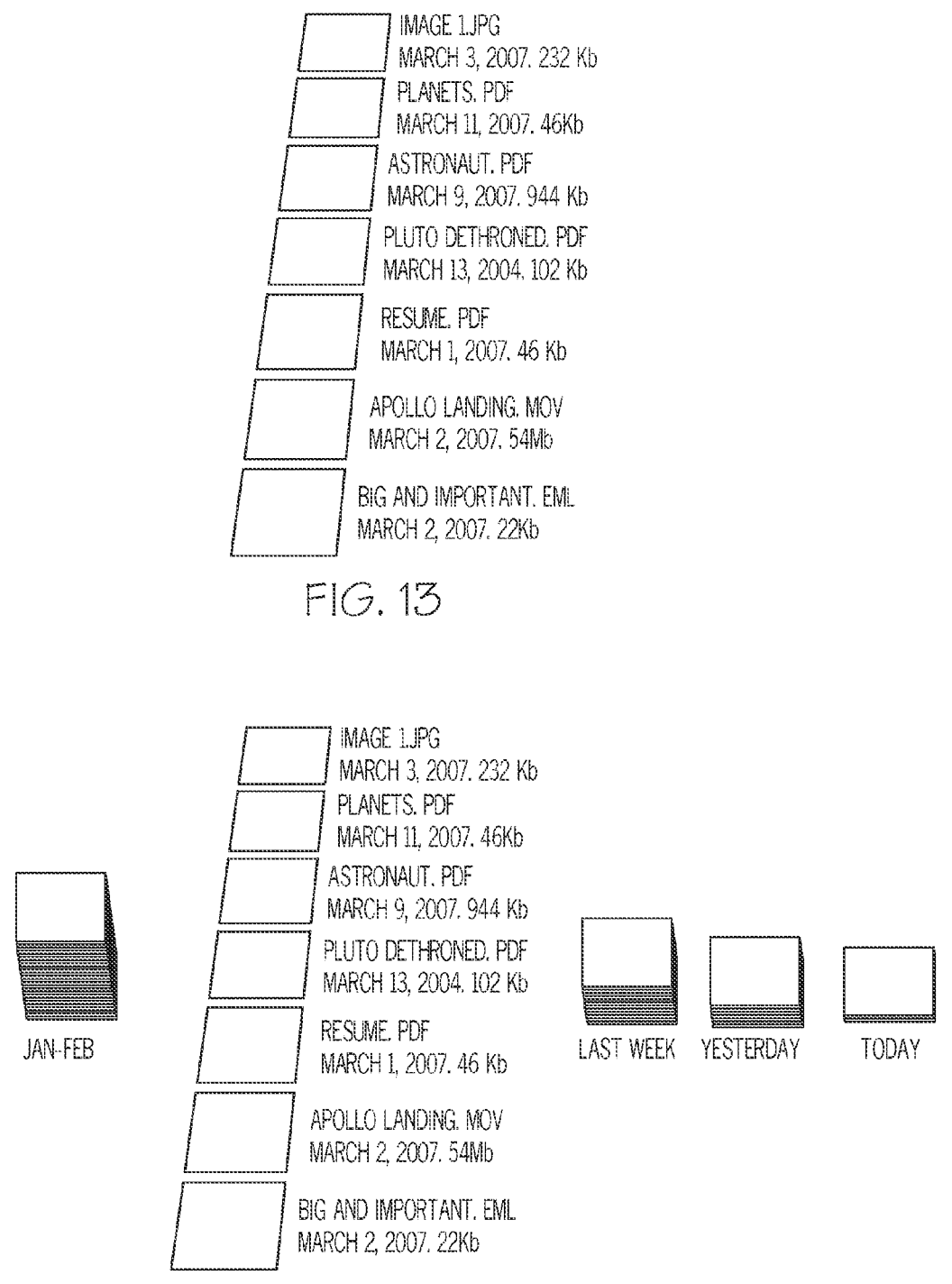

When the pen hovers over a pile, pile widgets (FIG. 4d) are revealed allowing the user to trigger various browsing techniques of the pile's contents (FIG. 5). Generally, the techniques are designed explicitly to support real-world pile browsing behaviour observed in office workers. The Fan-Out widget spreads pile display objects like a deck of cards on the user-drawn path, allowing pile contents to be viewed in parallel (FIG. 5f). Leafing through pile contents much like one flips through pages of a book is accomplished by scrubbing the Leafer widget (FIG. 5b). The Compression-Browse widget compresses display objects on one axis to reveal the display objects underneath, without moving display objects (FIG. 5c). The standard grid layout is also offered (FIG. 5e). Larger piles benefit from a fisheye view (FIG. 5a). The Messy/Tidy widget is like the inverse of the "Tidy/Make Pile" pile creation functionality described above. Seeing how piled objects were originally strewn about the desktop may aid recall of pile purpose or content (FIG. 5d). Scrubbing this widget interpolates between the messy and tidy poses and at the extreme messy pose an icon appears indicating the pile will be broken. Another view of piled contents is the Detailed List View. In this view display objects are vertically arranged in a line, with further textual information about the display object (i.e., in the case of files the file name, creation date and file size) displayed to the objects right-hand side (FIG. 13).

A user clicks and drags on a widget to immediately see its impact on the layout of the pile contents. Once the pen is released the objects smoothly return to their piled state, facilitating quick, transient browsing. For more involved interactions a pile can be locked down into any of the browsing states. This is done with the PressureLock technique described herein. Once a pile layout is locked, the widget turns into a red X (FIG. 5e) and can be collapsed back to its original state with a tap.

Hovering over a widget for some time presents a tooltip with a more detailed description of the widget's functionality. Widgets also act as crossing targets for the novel Drag'n'Cross technique for precise insertion of objects into a pile, as described later. All transitions between browsing styles are animated smoothly.

Figure 15A:
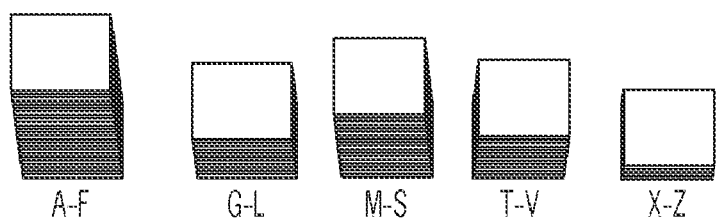
FIG. 15 illustrates a number of piles that were automatically created from an arbitrary selection of display objects. Display objects are organized into sub-piles according to (a) alphabetical order and (b) creation date.
Figure 15B:
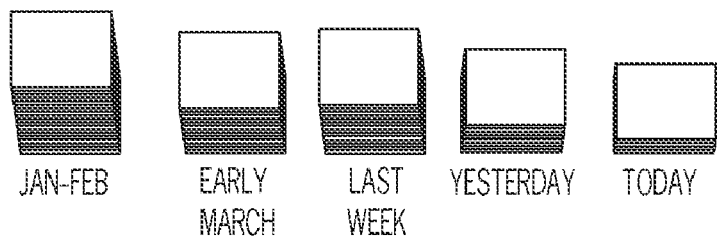

Objects need not be explicitly piled before applying the browsing tools. The LassoMenu may be used to trigger browsing of unpiled objects. For example, it may be useful to temporarily view casually strewn objects in a grid layout to see occluded objects. Compression-browse would similarly reveal occluded display objects without disturbing display objects. A collection of one or more display objects may be automatically piled into several piles according to information regarding the display object (FIG. 15) (i.e., date the file was last modified, the first letter of the file name). We have found that selecting a small number of sub-piles to represent the categories works best, such as 2 to 5 depending on how varied the collections data is. In this view the pile browsing techniques described above may further be used to allow further exploration of the display objects. Sub-piles are smoothly animated as little as necessary to create room for the browsed piles contents (FIG. 14).

Regional Visual Search

If a user wants to find a piled object but does not remember which pile it is in, he/she can use the browsing widgets to try and find it. However, for a large number of piles clicking widgets becomes tedious. For this situation there is the Exploding Piles functionality of the present invention, offering a way of visually searching pile contents regionally. Once Exploding Piles is invoked with the LassoMenu, piles are smoothly exploded into a grid view on hover. Moving the pen away collapses piles back to their original state. Exploding Piles exploits the rough spatial memory a user might have about what they're looking for. For example, if it is known a display object is in one of the piles in the top-right of your workspace you can inspect them by pointing at them.

Pressure Cursor and PressureLock Techniques

When users push very hard with the pen and reach the maximum pressure level, it acts as a trigger dubbed PressureLock which is used, for example, to lock a pile down into a specific browsing layout or pinning objects to the wall. Pushing the pen hard on the screen surface for pinning evokes similar actions in the real world.

To provide continuous visual feedback for the PressureLock technique there is provided a circular pressure cursor with an inner circle that increases in size with the current pressure level (FIG. 6). When the pressure level reaches its maximum, the color intensifies and the outline turns into a bright white to indicate a PressureLock has occurred. When a PressureLock is possible it is indicated by the outer ring turning a hollow white, enabling discovery amongst novice users. When PressureLock is used for locking down a pile browsing layout, there is provided a pressure-based confirmation of a preview, with the pen-up before maximum pressure is reached being equivalent to an undo. When pressure input does not exist, we can use a keyboard modifier key or a mouse button such as the standard right-mouse button to trigger the PressureLock interactions. This enables pressure-triggered interaction to work seamlessly with other input devices that don't provide pressure information (e.g., mouse, trackball, some touch sensitive screens, etc).

Adding to a Pile

In the real world one simply drops objects onto the top of a pile. Similarly, for casual and quick addition to the top of a pile we support tossing an object towards a pile. This is implemented by a threshold distance for piles that when approached by object(s) above a certain velocity inside that distance, they are smoothly added to the top of that pile. Alternatively gravitational fields are used to attract tossed display objects towards piles of similar content. For instance, a pile full of photos would have a greater pull on a photo being tossed by it than a neighbouring pile of spreadsheets. This also supports an escape velocity to allow display objects to be tossed beyond piles that may attract it. Another technique for adding to a pile allows display objects can be dragged on top of a pile that will highlight indicating that they will be added to the top on pen up. If the user drags an object to a pile and dwells, the pile is temporarily pushed apart allowing for precise insertion of that object into any location within the pile. Scrubbing the pen along the side of the pile varies the insertion point.

To avoid dwell which interrupts user flow, the present invention provides a more pen-centric interaction technique called Drag'n'Cross (FIG. 8). While dragging objects, users can cross through a pile widget to use one of the browsing techniques for specific insertion. For example, if you drag an object and cross the Leafer widget, the object will be inserted at the point that you had leafed to before lifting the pen. After precise insertion, added objects slightly stick out of the pile in the direction they were added from. This indicates the recent insertion and reminds users that further organization may be necessary. To tidy the pile again, the user can simply adjust the Messy widget.

Hierarchical Piles

Figure 16A:
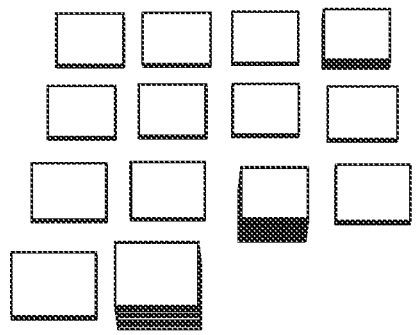
FIG. 16 a hierarchical pile whose contents are laid out in a grid arrangement and 3 sub-piles are visible. One sub-pile is further expanded into the grid arrangement (b).
Figure 16B:
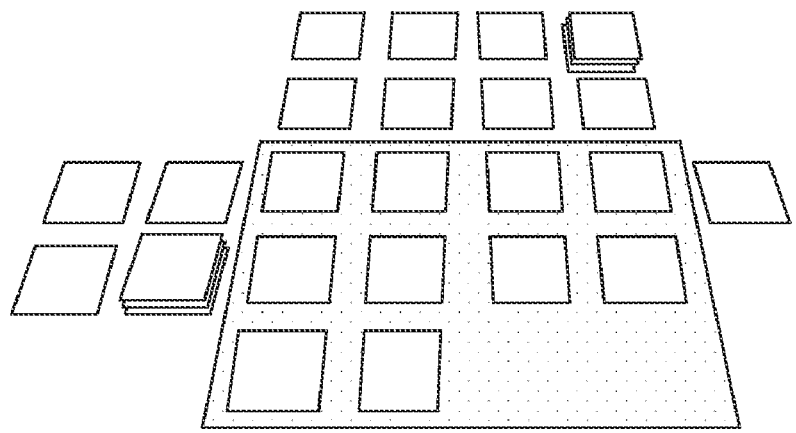

Elements of the two paper processing strategies can be blended: piling and hierarchical filing. In this hybrid technique, users can merge any combination of piles and objects into a new pile, using the same techniques employed to create a 'flat' pile out of just objects: LassoMenu or Lasso'n'Cross. The new hierarchical pile stores all information regarding the sub-piles and includes display objects sticking out in sub-piles. If the hierarchical pile is broken, sub-piles are restored in their original positions with changes, like display object deletions, folded through. When the hierarchical pile is browsed with one of the techniques described below, the sub-piles are seen as piles in the laid out version (FIG. 16a). These subpiles can further be browsed in the same fashion, and browsing them smoothly animates to adjust the already laid out display objects appropriately. The laid out subpile is shaded with a dark region behind it so that its contents to be distinguished from its parent pile (FIG. 16b). It should be understood that this works recursively for any arbitrary number of subpiles within an aggregate pile.

Manipulation of Pile Contents

While a pile is locked down into a browsing mode via the PressureLock technique or its mouse or keyboard equivalent described above, one can further manipulate the pile contents with the LassoMenu. While adding physics to the desktop enhances the realism, a user is not constrained to only physically realistic interactions. For example, a user can instantly sort piles or subselections by type or size. Deletion and duplication is also possible. To re-arrange pile order a user simply drags objects(s) to their new location within a locked down pile.

On real desks subtle techniques are used to convey information about objects in piles such as re-positioning or re-orienting certain display objects so they stick out. The present invention supports similar functionality to emphasize, distinguish and indicate separation of piled display objects. Display objects in a locked down pile can be re-oriented from the LassoMenu. Alternatively, groups of display objects can be re-positioned so they stick out (FIG. 9). Once re-positioning is initiated the pile smoothly collapses back to its piled state so it can be seen in context. Dragging moves objects parallel to the plane the pile sits in, to avoid changing pile order. If the objects are dragged so far that they no longer overlap any part of the pile, they are pulled out of the pile and become the active dragged selection. Note that the pen is still down and a user may fluidly proceed with other dragging interactions from here such as insertion into a pile via Drag'n'Cross or pinning up to a wall. Dragging display objects out of piles could also be used to split a pile if it is too large or cumbersome.

Figure 12:
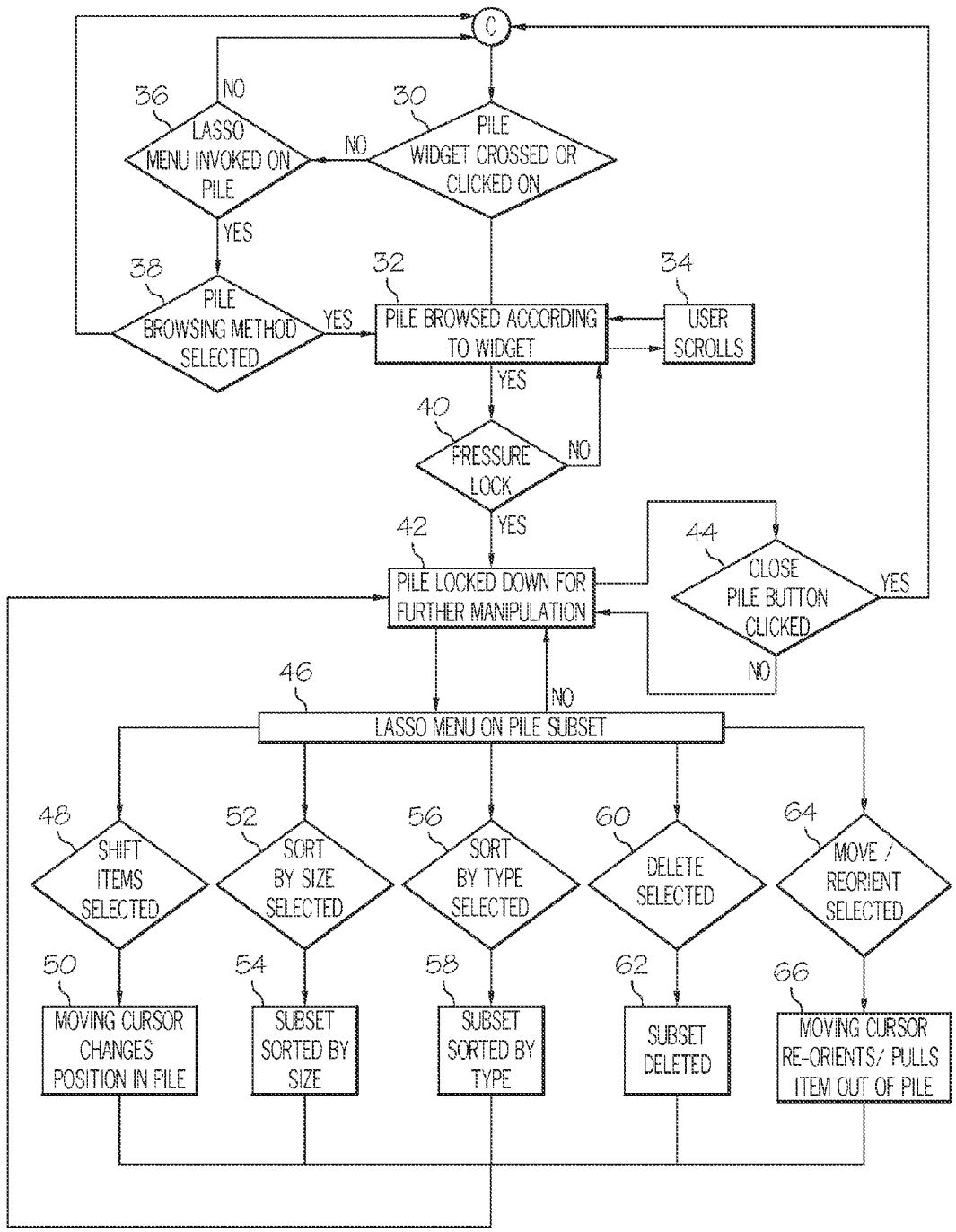
FIG. 12 illustrates a flowchart depicting the steps of a pile browsing and manipulation aspect of the present invention.

The particular steps of pile browsing and manipulation are best understood with reference to FIG. 12. A user first crosses or selects a pile widget (30). Alternatively, the Lasso Menu is invoked on the pile (36), providing a further means of a selecting a browsing method (38). Upon selection of the browsing method on the widget (32), PressureLock (40) can be triggered to lock down the pile for manipulation (42). There is a "close pile" button (44). Once locked down into a browsing mode using the PressureLock technique, the pile contents are manipulated with the LassoMenu (46). Objects can be shifted (48) by moving the cursor which alters the object's position in the pile (50). Objects can be sorted be size (52), and subsets can also be sorted (54). Objects can be sorted be type (56), and subsets can also be sorted (58). One or more objects can be deleted (60), or subsets deleted (62). Objects can also be moved and reoriented (64), using the cursor (60).

Enhancing Realism

Frequently accessed display objects are usually moved to the top of their piles, leaving less relevant material at the bottom due to repeated re-referencing. This is facilitated in the present invention by supporting easy removal and casual addition to the top of piles via tossing.

Giving Display Objects Affordances of Paper

The physical properties of paper include being thin, light, porous, opaque and flexible. Further, these properties afford different human actions including folding, crumpling, creasing, and pinning.

Our invention supports several manipulations that physical paper affords, in line with an aspect of the present invention comprising Tangible, Realistic Display Objects. This is supported by freeform creasing of a corner or folding of a document (FIG. 1). To escalate a document to even greater importance, it can be pinned up to a wall, or by using PressureLock to create a springy joint. To remove it a user simply pulls the document off the wall. Another technique is locking the rotation of objects to make them standup on end (FIG. 10), despite collisions. This is accomplished with a LassoMenu triggered rotation and PressureLock once the desired rotation is specified. Further, and in combination with all of the previous techniques, objects may be resized. Object density remains constant so bigger icons have more mass while reducing size reduces mass. Bigger documents are not only more visually noticeable but behave as though they are more important, displacing smaller display objects when moved and being difficult to move when bumped by smaller, lighter display objects.

To de-emphasize display objects a user can crumple them up (FIG. 1). This aspect provides an in-between state for display objects whose utility is questionable but are not quite ready for deletion. Crumpling is done from the LassoMenu which specifies a 2D parameter for distorting the object mesh. For example, a long quick stroke results in a tightly crumpled document.

When computer programs or services first launch, users are often presenting with a "splash screen" that contains the program or services branding information, amongst other things. In this invention we texture map "splash screen" onto simulated cloth, which can be teared open by the users cursor using mechanics rules. This is meant to be akin to opening a present in the real world, and slowly reveals the virtual environment presented behind the cloth. The cloth that is torn away falls into the virtual environment due to gravitational forces and fades away after a short time (5 seconds). After more than some percentage (e.g. 60%) of the virtual environment is visible the splash screen may disappear. Further, a button is presented so that at any time the user may skip the tearing process, as it is simply meant to enhance enjoyment and realism within the invention, and not be inefficient.

Figures 17A, 17B, 17C:
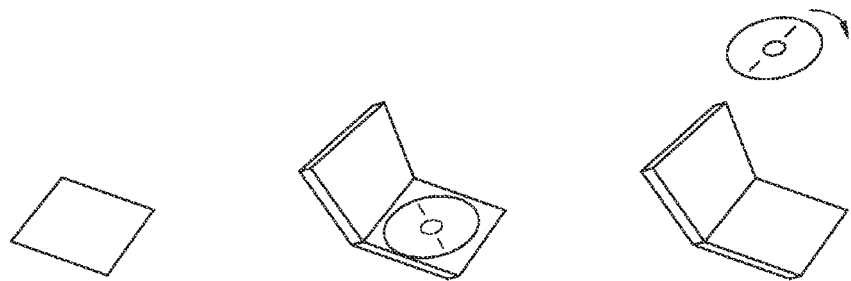
FIG. 17 illustrates a media display object being further in its default state (a), when it is further explored (b) and when its disc begins to rotate to signify it is being played (c).

Paper-like attributes are appropriate for display objects representing content that in the real world is often found on paper. Such display objects include documents, text, photographs, emails, web pages, etc. For other data types, such as media representing audio or video, other attributes are appropriate. In one aspect of the invention, we represent media display objects as consumer media products such as DVDs or CDs. The unactivated media display object appears with similar proportions to those in FIG. 1. One animation for further exploring the display object's contents (ie, to get more information about the particular display object, or to initiate playing of media display objects) is the flipping open of the virtual cover of the display object (FIGS. 17a, 17b). For media display objects this is visually familiar to opening a CD case. Further, an object which resembles a compact disc that is also texture-mapped with a relevant image smoothly rises from the "case" and spins if the media display object is played (FIG. 17c).

Animating Introduction of New Content

To introduce new content to the system we animate it in a user friendly fashion by "Dropping from the Sky". "The sky" is better defined as the position of the camera looking into the virtual environment. Objects drop in the direction the camera's view onto the virtual environment. Gravitational forces pull the falling display objects towards the virtual environment's surface. Mechanics rules govern the motion the falling display objects experience. This technique enhances realism and provides a user friendly metaphor for introducing new content to the user. For example, new emails may drop from the sky onto a particular region on the virtual desktop environment when they arrive, accumulating into a pile that visually reflects that their unorganized state. It also establishes a space where the user can expect to find new display objects of a particular type, leveraging spatial memory. Another example is If a duplicate of a display object is made, its duplicate can drop from the sky on top of or close to the source display object. In this case location for the drop is automatically determined by the duplication command. Another example is presented in the web browser context. Current web browsers such as Mozilla FIREFOX™ and Microsoft INTERNET EXPLORER™ 7.0 allow multiple webpages to be browsed simultaneously using "tabs". When a new tab is created in these interfaces it is placed in a one dimensional row of the existing tabs. In our invention, the tab would "drop from the sky" into the virtual environment, and could be organized as any other display object. This allows users to use three dimensional spatial memory and mechanics rules to enhance organization and management of display objects.

This technique may further be extended for collections of data that become available to the computing environment. When said data collection becomes available a display object representing the proportions and appearance of the physical form factor of the data collection can "Drop from the Sky" into the virtual environment. For example, if an Apple IPOD™ is connected to the computer, a 3 dimensional display object the resembles the Apple IPOD™ will land into the virtual environment. As a person skilled in the art would understand, these data collections could be any type of collection of data. For example, connecting an external USB storage device to the computing environment, or networked files residing on a remote machine to which a connection was just made. To transfer display objects to the data collections represented by display objects, the user may toss it towards the general direction of the data collection display object and it will be added according to the tossing algorithm provided for adding to a pile provided above.

Viewing Other Virtual Environments

Figure 18:
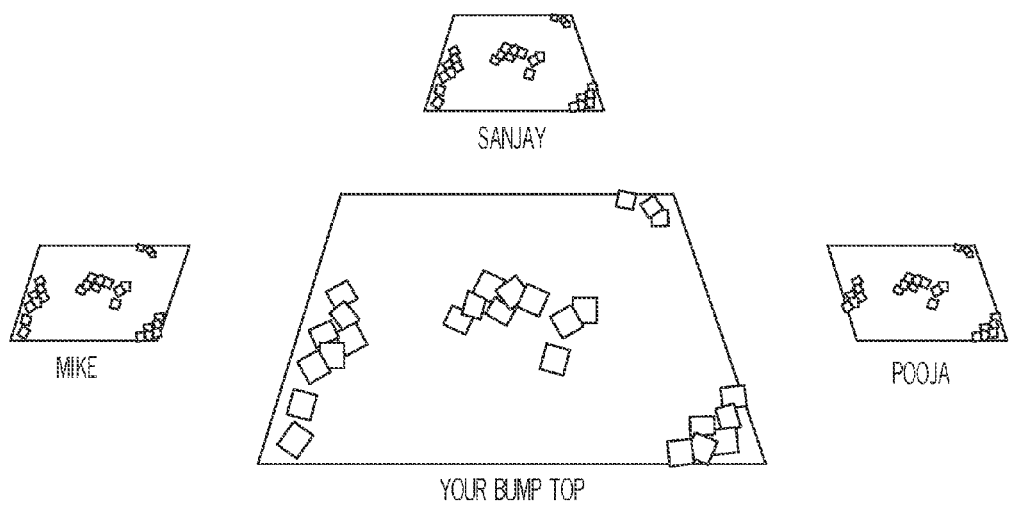
FIG. 18 illustrates viewing networked users virtual environments.

Users of multiple networked virtual environments may visualize the contents of other user's virtual environments that are connected via network. To enhance privacy, each user may specify a subset of display objects to make visible to other networked users, or rules for determining how which display objects to share with other networked users on their remotely displayed virtual environment. (i.e. display object icons may be visible while filenames are obscured to enhance privacy). In a networked environment, this can facilitate awareness between collaborators. Further, tossing can be used as an interaction technique to transfer files between these networked virtual environments using the algorithms described above. To smoothly transition to view of networked user's virtual environments, the camera can zoom out of the users personal environment to a view such as that presented in FIG. 18. The networked virtual environments can exist in a plane, and may be re-arranged according to mechanics rules as other display objects in the system.

Enhanced Search

When executing a search query, display objects representing the search results will "drop from the sky" into the virtual environment, as described above. This enhances the physicality and tangibility of the search. Results can further be organized in the same flexible ways as other display objects in the invention. The search query could be executed on any combination of information sources. For example, the users local hard disk, the internet's webpages, photographs, audio, videos, etc. In the example of web browsing, popular search engines such as GOOGLE™ or YAHOO™ typically represent search results as a linear listing of short text-based summaries. Our invention allows the results of a web search to be browsed in parallel as thubmanils of the webpage texture mapped onto display objects in the virtual environment. Browsing visual results in parallel enables better user performance of finding the information the are looking for due to increased informational bandwidth, and use of spatial memory to facilitate the organization, management and sense-making of search results.

We also embody other search result meta-data, such as relevance to mechanics properties of the display object. For example, more relevant search objects are represented as slightly larger and heavier than those that are less relevant. To represent related search results, we can present the group of related search results as piles. In these piles the top element would the original result from the search query. These piles can then be browsed using the techniques described above. The pile representation also allows the user to visualize how much related content is available.

Enhanced Tagging

Our invention supports enhanced techniques for tagging display objects. Display objects may be tossed around to create loose arrangements of the display objects. Tossing is advantageous because the mouse needs to travel less distance to toss an object, since it need not move exactly to a desired point, instead a general direction can be specified. In addition, tossing is more casual and as such encourages facilitates loose arrangements to be created before a high level structure of the information may be known. Once loose arrangements are created, Toss'n'Tag can be activated which detects white space between display objects and allows tag's for each grouping to be specified. Alternatively, the user may choose to associate spatial regions with specific tag(s) before beginning to toss things. These regions can partially overlap since tags are not mutually exclusive. If the regions fully overlap they are collapsed into a single region with multiple tags. The regions can be defined by encircling a region and then invoking the LassoMenu and selecting "Create Tag Region". Yet another way to tag documents includes creating tags that are visualized and interated as other display objects in the system. They can then be tossed at other display objects to tag them. When tags are piled they can be tossed as a group. These techniques apply to various display object types, and are highly relevant to images, documents, web pages, web content amongst others.

Polite Physics

The physical simulation can sometimes prove disruptive, and occasionally it can be disabled. For example, when display objects are in a messy or tidy pile and if physics are enabled, the collision detection of perfectly touching display objects can cause numerical instability, jittering and unnecessary movement by piled display objects. Also, dragged icons can knock over piles.

Further, un-restricted mechanics allows six degrees of freedom in the potential positions of objects. This added freedom and expressiveness also affords more ways to "make a mess". Therefore, in a further aspect of the present invention, all display objects can remain axis-aligned. Collisions are no longer physically accurate but objects are easily readable remaining properly oriented, more closely resembling modem GUI desktops. In this mode the desktop seems aesthetically tidier but looks and feels mechanical (FIG. 10). Alternatively, a small amount of off-axis rotation can be allowed to make the appearance less rigid while maintaining readability and preventing objects from becoming too messy. We allow a fixed number of degrees of rotation about the axis that is normal to the virtual environment's desktop surface.

Implementation

In a particular implementation, BumpTop™ runs in real-time on a Toshiba M200 TabletPC with a 1.6 Ghz CPU, 1 GB RAM and an NVIDIA GeForce™ FX Go 5200 graphics card. The example, the software is written with C++, OpenGL and GLUT.

The mechanics, e.g., the rigid body dynamics, physical simulation and collision detection rules, are provided by the AGEIA PhysX™ SDK.

User Evaluation

To evaluate the implementation of the present invention a qualitative user study was conducted. Six participants (2 female, 4 male with computer skills ranging from novice computer users to pen-interface experts) participated in videotaped think-aloud sessions lasting an hour each. This consisted of a 3 min introduction, 10 min "discovery" period where users explored the system, followed by instruction on the remaining functionality they didn't discover. Finally 29 tasks were performed that could be completed using multiple strategies. Post-study written and verbal questionnaires were also completed.

The results were positive. Participants were able to discover functionality on their own and became comfortable and proficient accomplishing most tasks. Questionnaire responses confirmed that: techniques were easy to learn (4.7/5), users were able to accomplish what they trying to do (4.4/5), users liked the software (4.7/5), and software felt familiar (4.5/5). Techniques like tossing were found empowering as they allowed leveraging of real-world knowledge. Many participants found the interface playful, fun and satisfying.

Lasso'n'Cross was the preferred technique for pile creation. Most users quickly became comfortable with it and several stated that creating and browsing piles with Grid, Leafer or Fanout were amongst their favourite interactions.

With respect to the discoverable, learnable interface, users were able to complete approximately 88% of tasks without extensive training. Participants used the 10 min "discovery" portion of the experiment in different ways. Some experimented with the movement of objects and spatial layouts. All experimented with the pile widgets to invoke the various browsing methods and discovered interaction techniques not explicitly mentioned in the introduction. In addition, some participants emphatically stated that if they were given the tasks again they could effortlessly complete them.

With respect to realistic feel and enjoyable user experience, during the discovery period and idle time between tasks users were seen playfully tossing or rearranging display objects or watching the results of collisions. This playfulness also translated to users becoming proficient at arranging display objects with subtle and precise movements. For example, within minutes one participant was delicately balancing a document on top of another document pinned up to the wall. One participant carefully arranged icons on edge and toppled them over like dominoes. This behaviour suggests successful leveraging of real world knowledge of movement. Tossing was preferred to dragging for insertion by 4 of 6 users. Pressure based techniques were learned and used with little error.

What is claimed is:

1. A method comprising:
   generating, by a computing device, display objects for display in a virtual environment, the display objects representing one or more collections of data;
   receiving, at a touch-based input device operatively coupled to the computing device, a user input comprising a gesture that at least partially encloses a group of the display objects representing the one or more collections of data, wherein the gesture intersects with a selection icon, wherein the selection icon is generated for display in response to detecting at least a portion of the gesture and prior to the gesture intersecting with the selection icon, wherein each display object of the group of display objects at least partially enclosed by the gesture is displaced at a different position in the virtual environment;
   determining, by the computing device, a distance between first and second end points of the gesture;
   selecting, by the computing device and after determining that the gesture intersects with the selection icon, an option associated with the distance from a plurality of options associated with a range of distances, wherein the distance is included in the range of distances; and
   in response to determining that the gesture intersects with the selection icon, generating, by the computing device and based at least in part on the selected option, the group of display objects for display in an axial alignment, wherein each display object of the group of display objects is stacked in the axial alignment, such that display objects of the group of display objects appear to be stacked on top of each other.

2. The method of claim 1, wherein the virtual environment is a virtual desktop and the display objects are icons, each icon representing one of:
   a file;
   a directory; and
   an application program.

3. The method of claim 1, wherein an appearance of the display objects is defined by attributes of the one or more collections of data.

4. The method of claim 1, wherein the virtual environment is a virtual two-dimensional or virtual three-dimensional desktop.

5. The method of claim 1, wherein the one or more collections of data are digital files selected from the group consisting of text, documents, images, audio, web pages, web content, web search results, products in an online store, services in an online store, videos, and software programs and file system directories.

6. The method of claim 1, wherein the touch-based input device comprises a digital pen or a touch-sensitive surface.

7. The method of claim 1, further comprising:
   enabling real-time user interaction with the display objects in the virtual environment, wherein the user interaction with the display objects in the virtual environment is defined by pre-determined mechanics rules.

8. The method of claim 7, wherein attributes of the display objects define the user interaction according to the mechanics rules.

9. The method of claim 7, wherein the mechanics rules include simulation rules selected from the group consisting of gravity, position of the display objects, mass of the display objects, velocity of the display objects, friction between the display objects, collisions between the display objects and rigidity of the display objects.

10. The method of claim 7, wherein the user interaction includes piling of the display objects in the virtual environment.

11. The method of claim 10, wherein the piling includes pile-to-pile interactions, intra-pile interaction, pile widgets, hierarchical piles, transition between unpiled and piled display objects, and piling of arbitrarily sized display objects.

12. The method of claim 7, wherein the user interaction comprises the user input received at the touch-based input device.

13. The method of claim 1, further comprising:
receiving, at the touch-based input device associated with the computing device, a second user input comprising a second gesture to select the group of the display objects representing the one or more collections of data;
in response to receiving the second user input, generating for display in the virtual environment, by the computing device, one or more widgets associated with one or more display operations, wherein each of the one or more display operations generates for display the group of display objects in a different pre-defined configuration;
receiving, at the touch-based input device associated with the computing device, a third user input comprising a third gesture to select one of the one or more widgets; and
in response to receiving the third user input, generating for display in the virtual environment, by the computing device, the selected group of display objects in one of the different pre-defined configurations based at least in part on the third user input.

14. The method of claim 1, wherein the user input is a first user input, the gesture is a first gesture, and the distance is a first distance, the method further comprising:
receiving, at the touch-based input device associated with the computing device, a second user input comprising a second gesture that at least partially encloses the group of display objects stacked in the axial alignment;
determining, by the computing device, a second distance between first and second end points of the second gesture, wherein the first distance is different than the second distance;
selecting, by the computing device, an option associated with the second distance from the plurality of options associated with the range of distances, wherein the second distance is included in the range of distances; and
generating, by the computing device based at least in part on the selected option, the group of display objects for display, wherein each display object of the group of display objects is displaced at a different position in the virtual environment.

15. The method of claim 14, further comprising:
determining, by the computing device, a selection of the second distance within the range of distances, wherein a degree of displacement of the group of display objects at different positions in the virtual environment is based at least in part on the second distance within the range of distances.

16. The method of claim 1, further comprising:
determining, by the computing device, a selection of the distance within the range of distances, wherein a degree of axial alignment of the group of display objects in the virtual environment is based at least in part on the second distance within the range of distances.

17. The method of claim 1, further comprising:
determining, by the computing device, a centroid of the at least partially enclosed group of the display objects; and
generating for display, by the computing device and at the touch-based input device, the selection icon at the centroid of the at least partially enclosed group of the display objects.

18. A system comprising:
a touch-based input device;
a computer; and
an application loaded on the computer, the application being operable to provide instructions to the computer that:
generate display objects for display in a virtual environment, the display objects representing one or more collections of data;
receive at the touch-based input device a user input comprising a gesture that at least partially encloses a group of the display objects representing the one or more collections of data, wherein the gesture intersects with a selection icon, wherein the selection icon is generated for display in response to detecting at least a portion of the gesture and prior to the gesture intersecting with the selection icon, wherein each display object of the group of display objects at least partially enclosed by the gesture is displaced at a different position in the virtual environment;
determine a distance between first and second end points of the gesture;
select, after determining that the gesture intersects with the selection icon, an option associated with the distance from a plurality of options associated with a range of distances, wherein the distance is included in the range of distances; and
in response to determining that the gesture intersects with the selection icon, generate, based at least in part on the selected option, the group of display objects for display in an axial alignment, wherein each display object of the group of display objects is stacked in the axial alignment, such that display objects of the group of display objects appear to be stacked on top of each other.

19. A non-transitory computer-readable medium comprising instructions that, when executed, cause a processor to:
generate display objects for display in a virtual environment, display objects representing one or more collections of data;
receive, at a touch-based input device operatively coupled to the computing device, a user input comprising a gesture that at least partially encloses a group of the display objects representing the one or more collections of data, wherein the gesture intersects with a selection icon, wherein the selection icon is generated for display in response to detecting at least a portion of the gesture and prior to the gesture intersecting with the selection icon, wherein each display object of the group of display objects at least partially enclosed by the gesture is displaced at a different position in the virtual environment;
determine a distance between first and second end points of the gesture;
select, by the computing device and after determining that the gesture intersects with the selection icon, an option associated with the distance from a plurality of options associated with a range of distances, wherein the distance is included in the range of distances; and
in response to determining that the gesture intersects with the selection icon, generate, based at least in part on the selected option, the group of display objects for display in an axial alignment, wherein each display object of the group of display objects is stacked in the axial alignment, such that display objects of the group of display objects appear to be stacked on top of each other.

* * * * *